(12) United States Patent
Homma (10) Patent No.: US 12,356,070 B2
(45) Date of Patent: Jul. 8, 2025

(54) FOCUS INFORMATION OBTAINING APPARATUS, FOCUS INFORMATION OBTAINING METHOD, AND COMPUTER READABLE STORAGE MEDIUM FOR OBTAINING INFORMATION ON A FOCUS STATE BASED ON AN OUTPUT OF A DETECTOR

(71) Applicant: CANON KABUSHIKI KAISHA, Tokyo (JP)

(72) Inventor: Taiki Homma, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 18/150,098

(22) Filed: Jan. 4, 2023

(65) Prior Publication Data

US 2023/0224580 A1 Jul. 13, 2023

(30) Foreign Application Priority Data

Jan. 11, 2022 (JP) .................................. 2022-002113

(51) Int. Cl.
*H04N 23/67* (2023.01)
*G03B 13/36* (2021.01)
*G06T 7/20* (2017.01)
*G06V 10/60* (2022.01)

(52) U.S. Cl.
CPC ........... *H04N 23/672* (2023.01); *G03B 13/36* (2013.01); *G06T 7/20* (2013.01); *G06V 10/60* (2022.01)

(58) Field of Classification Search
CPC ...... H04N 23/672; H04N 23/69; G03B 13/36; G06T 7/20; G06V 10/60; G02B 7/282; G02B 7/28
See application file for complete search history.

(56) References Cited

U.S. PATENT DOCUMENTS

| 7,116,502 | B2* | 10/2006 | Kawanami | G02B 7/08 |
| | | | | 396/93 |
| 2008/0247741 | A1* | 10/2008 | Yasuda | H04N 23/673 |
| | | | | 348/E5.045 |
| 2010/0278520 | A1* | 11/2010 | Karasawa | G02B 7/34 |
| | | | | 396/95 |
| 2016/0219213 | A1* | 7/2016 | Matsui | H04N 23/673 |
| 2017/0054896 | A1* | 2/2017 | Sugitani | H04N 23/67 |
| 2019/0394406 | A1* | 12/2019 | Shimizu | G02B 7/282 |
| 2020/0036902 | A1* | 1/2020 | Sugitani | H04N 23/951 |

FOREIGN PATENT DOCUMENTS

| JP | S63201634 A | 8/1988 |
| JP | S63201634 U | 12/1988 |

* cited by examiner

*Primary Examiner* — Padma Haliyur
(74) *Attorney, Agent, or Firm* — Canon U.S.A., Inc. IP Division (57) ABSTRACT

A focus information obtaining apparatus including a detector, a controller, and an obtaining unit. The detector is configured to detect at least a part of a light beam from an object via an optical member. The controller is configured to control driving of the detector. The obtaining unit is configured to obtain information on a focus state based on an output of the detector. The controller is configured to control driving of the detector based on a temporal change rate of at least one of information based on an output of the detector and a driving state of the optical member.

15 Claims, 12 Drawing Sheets

FOCUS INFORMATION OBTAINING APPARATUS, FOCUS INFORMATION OBTAINING METHOD, AND COMPUTER READABLE STORAGE MEDIUM FOR OBTAINING INFORMATION ON A FOCUS STATE BASED ON AN OUTPUT OF A DETECTOR

BACKGROUND

Technical Field

One disclosed aspect of the embodiments relates to a focus information obtaining apparatus, a lens apparatus, an image pickup apparatus, a focus information obtaining method, and a computer-readable storage medium.

Description of the Related Art

As an autofocus (in-focus information obtaining) technique in an image pickup apparatus, there is a technique of forming a pair of subject image signals on a sensor based on light beams that have passed through different regions in an exit pupil. The defocus amount (in-focus information) of the object can be obtained based on the relative positions of the pair of object images.

In moving image capturing, it is preferable to control a position of a focus lens unit so as to always maintain an in-focus state. However, defocusing may occur due to movement of an object, driving of a lens unit in an image pickup apparatus, or the like.

For example, a depth of field changes depending on a focal length of the lens. Therefore, even if the subject distance does not change, the in-focus state can change.

Japanese Patent Application Laid-Open No. S63-201634 discloses a technique for improving followability (readiness) to a change in an in-focus state by shortening a light receiving time (for example, a charge accumulation time) of a sensor during zooming.

In the technology disclosed in Japanese Patent Application Laid-Open No. S63-201634, a signal intensity sufficient for focus detection (in-focus information obtainment) during zooming may not be obtained depending on the brightness of an object. Further, an extremely low-speed zooming is often used for capturing a moving image for image expression, and in this case as well, it is not preferable for a focusing accuracy to uniformly shorten the light receiving time regardless of the zoom speed.

SUMMARY

An aspect of the disclosure provides, for example, a focus information obtaining apparatus beneficial in focusing precision.

According to an aspect of the disclosure, a focus information obtaining apparatus includes a detector, a controller, and an obtaining unit. The detector is configured to detect at least a part of a light beam from an object via an optical member. The controller is configured to control driving of the detector. The obtaining unit is configured to obtain information on a focus state based on an output of the detector. The controller is configured to control driving of the detector based on a temporal change rate of at least one of the information based on an output of the detector and a driving state of the optical member.

Further features of the disclosure will become apparent from the following description of exemplary embodiments with reference to the attached drawings.

DESCRIPTION OF THE EMBODIMENTS

Hereinafter, an autofocus apparatus (focus information obtaining apparatus) according to an embodiment of the disclosure will be described in detail with reference to accompanying drawings. In the drawings, the same components are denoted by the same reference numerals, and overlapping description will be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described herein. In addition, the term "element," "assembly," "component," or "device" may also refer to "circuit" with or without integration with packaging materials.

Embodiment 1

Hereinafter, the first embodiment will be described with reference to FIGS. 1 to 5.

Figure 1:
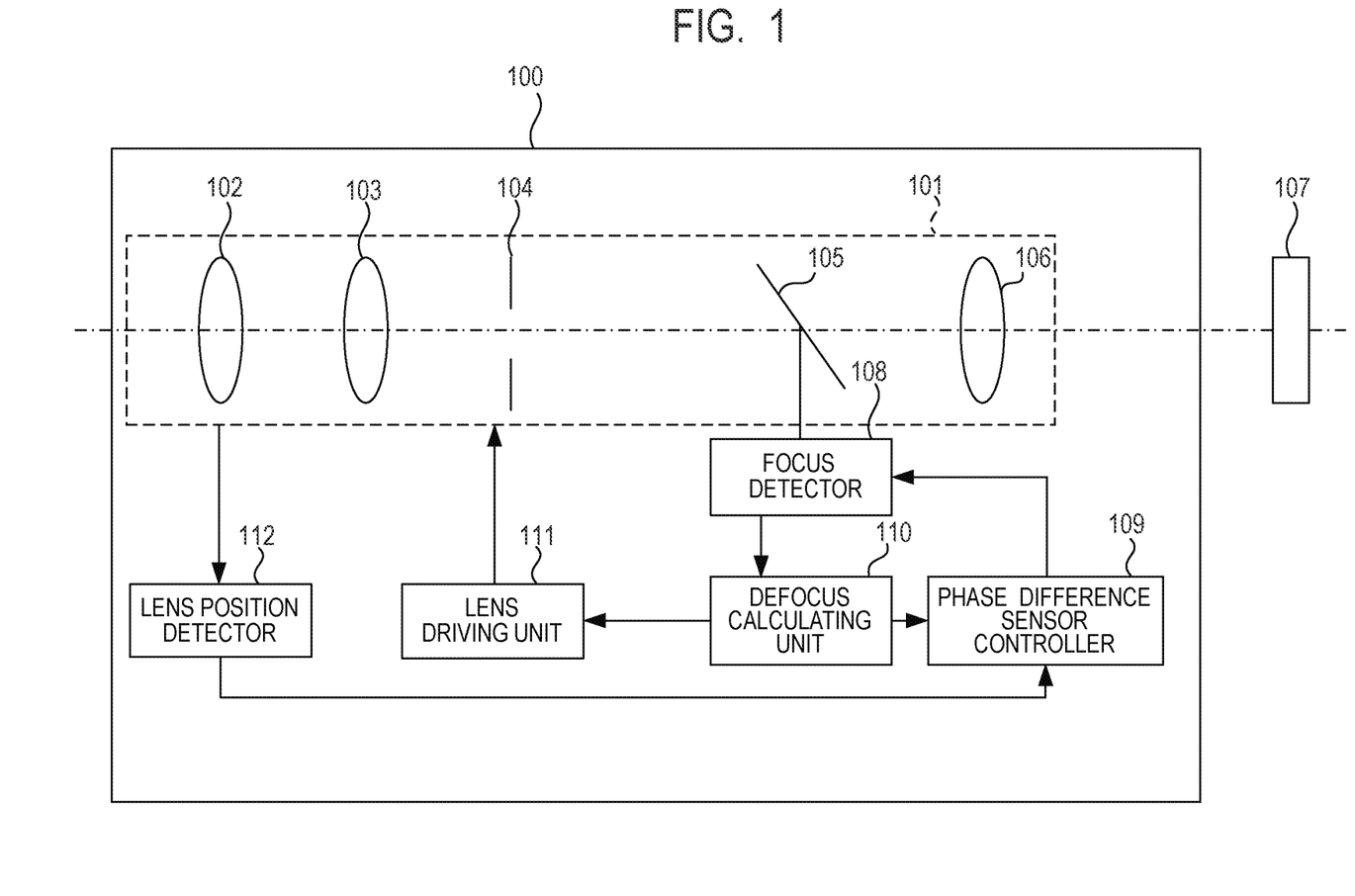
FIG. 1 is a block diagram showing a configuration of an autofocus apparatus according to an embodiment.

FIG. 1 shows a configuration of a lens apparatus 100 according to the first embodiment of an autofocus apparatus of the disclosure.

The lens apparatus 100 causes a light beam that has passed through an optical member 101 to enter an image pickup element 107.

The optical member 101 includes a focus lens unit 102, a zoom lens unit 103, an aperture stop 104, a spectral prism 105, and a relay lens unit 106.

The focus lens unit 102 is moved in an optical axis direction by a focus motor (not shown) to change a position of an image plane of the lens apparatus 100.

The zoom lens unit 103 is moved in the optical axis direction by a zoom motor (not shown) to change a focal length of the lens apparatus 100. The zoom lens unit 103 may be manually operated by an operating member (not shown).

The aperture stop 104 is driven by an iris motor (not shown), and limits a light beam incident on an image pickup element 107.

The spectral prism 105 separates the light having passed through the focus lens unit 102 and the zoom lens unit 103 into two light beams. One of the light beams that has passed through the spectral prism 105 passes through the relay lens unit 106 and enters the image pickup element 107. The other light beam which is reflected by the spectral prism 105 enters the focus detector 108.

The focus detector 108 is constituted by spectacle lenses and a phase difference sensor, and photoelectrically converts a pair of images (object images) (two images) formed by two light beams separated by the spectacle lenses using the phase difference sensor.

A phase difference sensor controller 109 is a controller for controlling the phase difference sensor included in the focus detector 108. By controlling the phase difference sensor in the focus detector 108, the phase difference sensor controller 109 effectively controls driving of the focus detector 108. The phase difference sensor controller 109 determines setting values (phase difference sensor driving conditions) such as a gain and an accumulation time (charge accumulation time) of the phase difference sensor, and drives the phase difference sensor and therefore controls driving of the focus detector 108. When the gain is increased, the amplification factor of the image signal output from the phase difference sensor increases, and the output value of the signal increases. Also, when the accumulation time is lengthened, the time for capturing the image signal input to the phase difference sensor becomes longer, and the output value of the signal becomes larger. The phase difference sensor controller 109 determines the next phase difference sensor driving condition based on the previous driving condition of the phase difference sensor, the object brightness value and the contrast value input from a defocus calculating unit 110, and the driving state of an optical member 101 detected by a lens position detector 112.

The defocus calculating unit (defocus amount obtaining unit) 110 calculates a phase difference between the pair of image signals which is a part of a light beam for photography photoelectrically converted by the focus detector 108, and calculates a defocus amount. In addition, the defocus calculating unit 110 calculates an object brightness value and an object contrast value from the pair of image signals and input the values to the phase difference sensor controller 109.

The lens driving unit 111 drives and controls the focus lens unit 102 in accordance with the defocus amount calculated by the defocus calculating unit 110. The lens driving unit 111 receives drive commands for the zoom lens unit 103 and the aperture stop 104, and drives and controls the zoom lens unit 103 and the aperture stop 104. The drive commands for the zoom lens unit 103 and the aperture stop 104 may be received from a camera or may be received from a controller operated by a user.

The lens position detector 112 independently detects positions of the focus lens unit 102, the zoom lens unit 103, the aperture stop 104, and the relay lens unit 106. Examples of the position detecting means include an encoder and a potentiometer.

Figure 2:
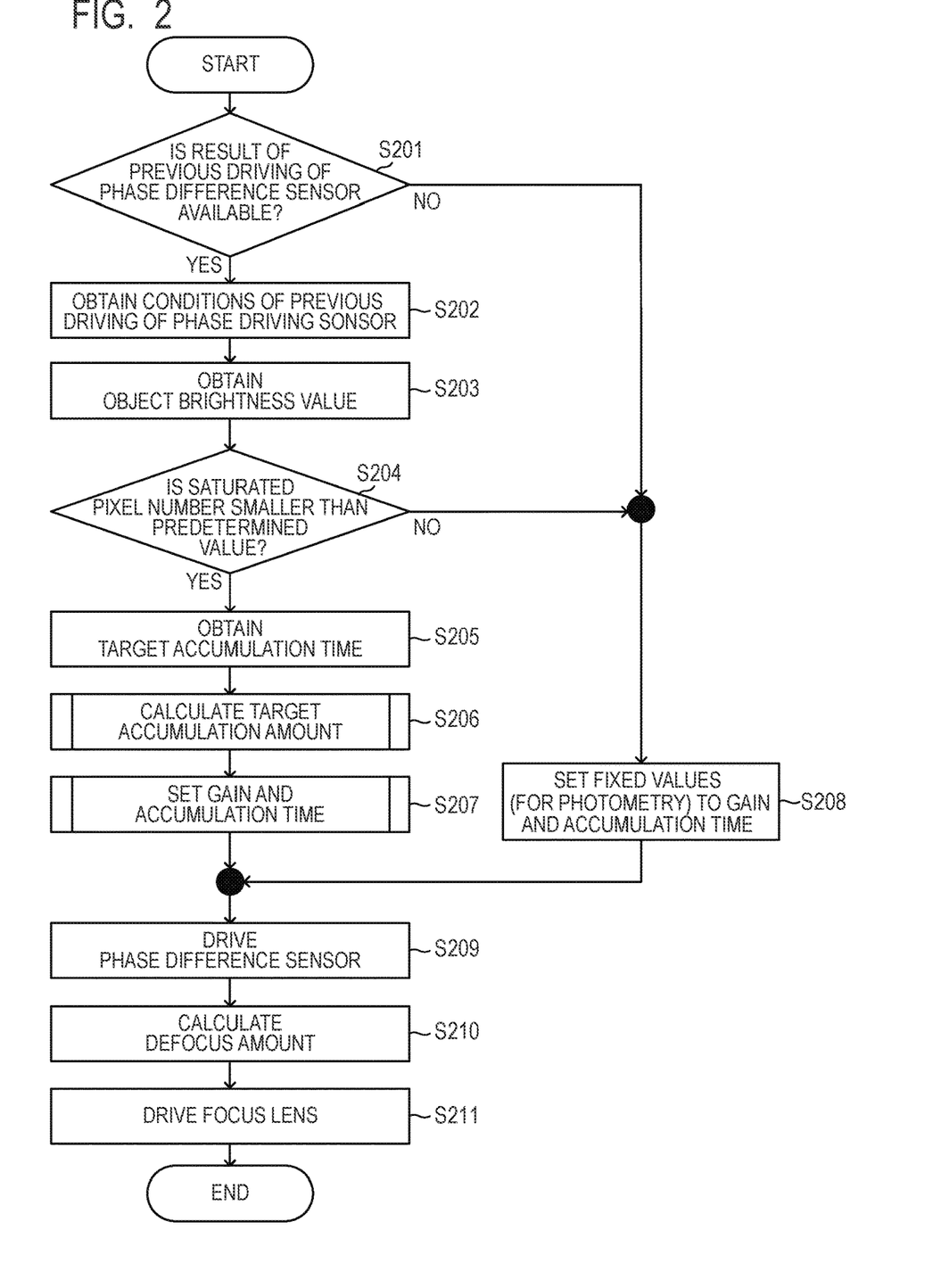
FIG. 2 is a flowchart of a process of determining a phase difference sensor driving condition.

FIG. 2 is a flowchart of the process in which the phase difference sensor controller 109 determines a phase difference sensor driving condition. The autofocus apparatus according to the present embodiment determines the driving condition of the phase difference sensor in accordance with the driving speed of the zoom lens unit 103 and the object contrast value. Specifically, a gain and the accumulation time of the phase difference sensor are obtained by performing focus detection at a higher frequency (shorter period) as the driving speed of the zoom lens unit 103 is higher, and calculating an accumulation amount (charge accumulation amount) for obtaining an image signal amount sufficient for focus detection.

In step S201, it is determined whether or not the previous phase-difference sensor driving result is available, and if available, the process proceeds to step S202, and if not available, the process proceeds to step S208. The case where the previous phase difference sensor driving result cannot be used is, for example, a case where the phase difference sensor is driven for the first time or a case where a predetermined time or more has elapsed since the previous driving of the phase difference sensor.

In step S202, the previous phase-difference sensor driving condition is obtained, and the process proceeds to step S203. The phase difference sensor driving condition is, for example, the gain or the accumulation time.

In step S203, the object brightness value calculated by the defocus calculating unit 110 is obtained, and the process proceeds to step S204. The object brightness value may be calculated by obtaining a maximum value of output pixels of the phase difference sensor or an integral value of the output pixels. Further, the pixel range used for the calculation may be changed according to information such as a range-finding frame.

In step S204, it is determined whether or not the number of saturated pixels is less than a predetermined value (less than a threshold), and if it is less than the predetermined value, the process proceeds to step S205, and if it is equal to or greater than the predetermined value, the process proceeds to step S208. When the output value of the phase difference sensor reaches the maximum level (is saturated), correct brightness information cannot be obtained, and appropriate phase difference sensor driving conditions cannot be calculated. Therefore, if the number of saturated pixels is equal to or greater than the predetermined value, the phase difference sensor driving condition for photometry is set. It should be noted that although the processing for making a determination based on the number of saturated pixels has been described here, processing for making a determination based on whether or not a subject brightness value is equal to or greater than a predetermined value may be employed.

In step S205, a target accumulation time as a target value (threshold) of the accumulation time is obtained, and the process proceeds to step S206. The target accumulation time may be input by the user or may be received from the camera. Alternatively, it may be a predetermined fixed value.

In step S206, the target accumulation amount is calculated, and the process proceeds to step S207. The process of calculating the target accumulation amount will be described in detail with reference to FIG. 3 later.

In step S207, a gain and the accumulation time are set, and the process proceeds to step S209. Processing for setting the gain and the accumulation time will be described in detail with reference to FIG. 4 later.

In step S208, the gain and the accumulation time are set to fixed values for photometry, and the process proceeds to step S209. The fixed value for photometry is set such that, for example, the gain is set to the maximum and the accumulation time is set to a short value in order to immediately complete the photometry processing. Here, an example in which the set values for photometry are fixed values has been described, but a configuration in which the set values for photometry are variable may be employed assuming a case where subject brightness information cannot be obtained with desired accuracy even if photometry processing is performed a plurality of times.

In Step S209, the phase difference sensor is driven under the phase difference sensor driving condition obtained in Step S207 or Step S208, and its output signal is obtained. The time for obtaining the signal depends on the accumulation time determined in step S207 or step S208.

In step S210, a relative positional relationship (phase differences) between the pair of image signals is obtained from the signals obtained in step S209, the defocus amount is calculated from the phase differences, and the process proceeds to step S211. When the driving condition of the phase-difference sensor is set for photometry in step S208, the processing may be ended without performing the processing in step S210 and subsequent steps.

In step S211, a drive position of the focus lens unit 102 is obtained from the defocus amount calculated in step S210, and drive control is performed.

The processing described with reference to FIG. 2 is repeatedly performed during execution of the operation of focus adjustment. A period of the control mainly depends on the accumulation time of the phase difference sensor. In this embodiment, the target accumulation amount is calculated based on the driving speed of the zoom lens unit 103, the object brightness, and the contrast value, and the accumulation time is determined. Thus, the control of the focus adjustment is performed so as to improve followability to a change in a focus detection position while maintaining the accuracy of the focus detection at a certain level or higher.

Figure 3:
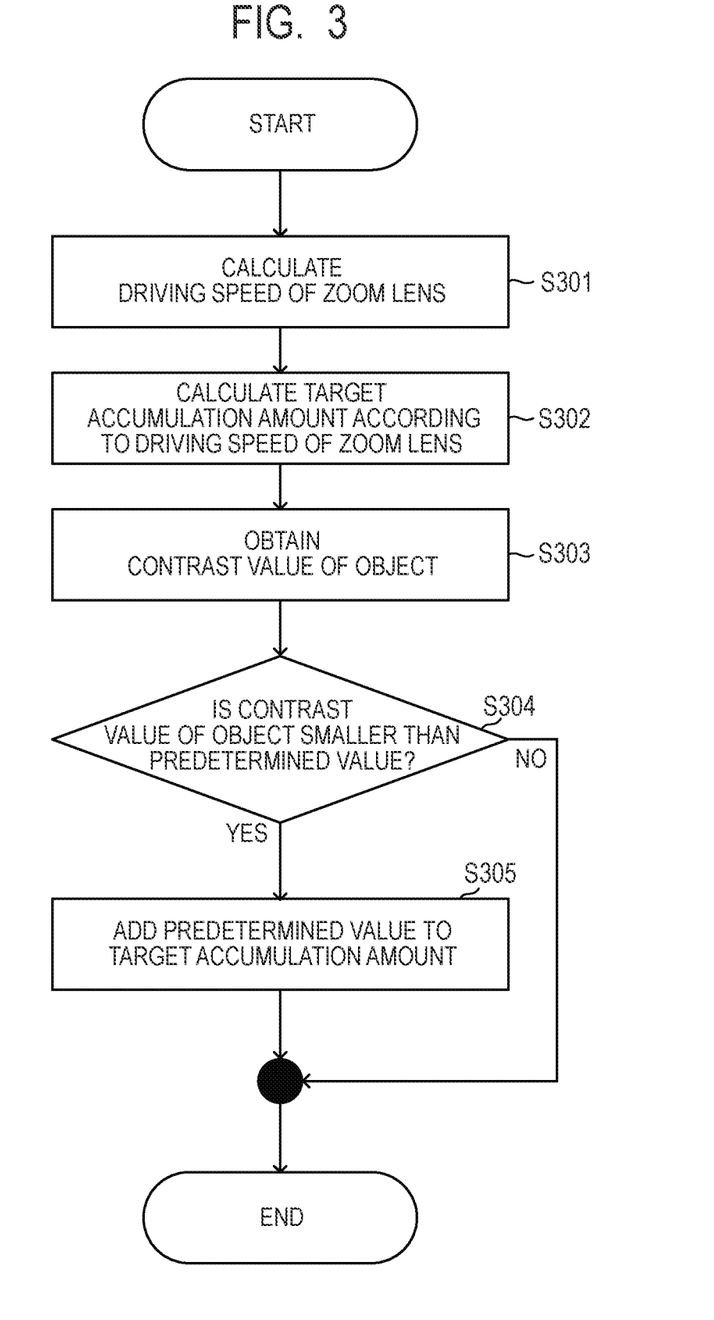
FIG. 3 is a flowchart of a process of calculating a target accumulation amount.

FIG. 3 is a flowchart of a process for calculating the target accumulation amount in step S206.

In step S301, the driving speed of the zoom lens unit 103 is calculated based on the position information of the zoom lens unit 103 detected by the lens position detector 112, and the process proceeds to step S302.

In step S302, the target accumulation amount is calculated based on the driving speed of the zoom lens unit 103, and the process proceeds to step S303. A relationship between the driving speed of the zoom lens unit 103 and the target accumulation amount will be described with reference to the graph of FIG. 5 (described later).

In step S303, the object contrast value calculated by the defocus calculating unit 110 is obtained, and the process proceeds to step S304. The object contrast value may be calculated by integrating an absolute value of a difference between adjacent pixels of the output pixels of the phase difference sensor or by integrating a square of a difference between the adjacent pixels. Further, a range of the pixels used for the calculation may be changed in accordance with information on a range-finding frame or the like.

In step S304, it is determined whether or not the subject contrast value obtained in step S303 is less than a predetermined value. If the subject contrast value is less than the predetermined value, the process proceeds to step S305, and if the subject contrast value is equal to or greater than the predetermined value, the process is terminated.

In step S305, a value obtained by adding a predetermined value to the target accumulation amount obtained in Step S302 is updated as the target accumulation amount, and the process is terminated. When the object contrast value is low, the accuracy of the defocus amount calculated by the defocus calculating unit 110 decreases. Therefore, as described in this example, it is desirable to increase the target accumulation amount obtained in step S302 to increase the accuracy of the phase-difference sensor.

Figure 4:
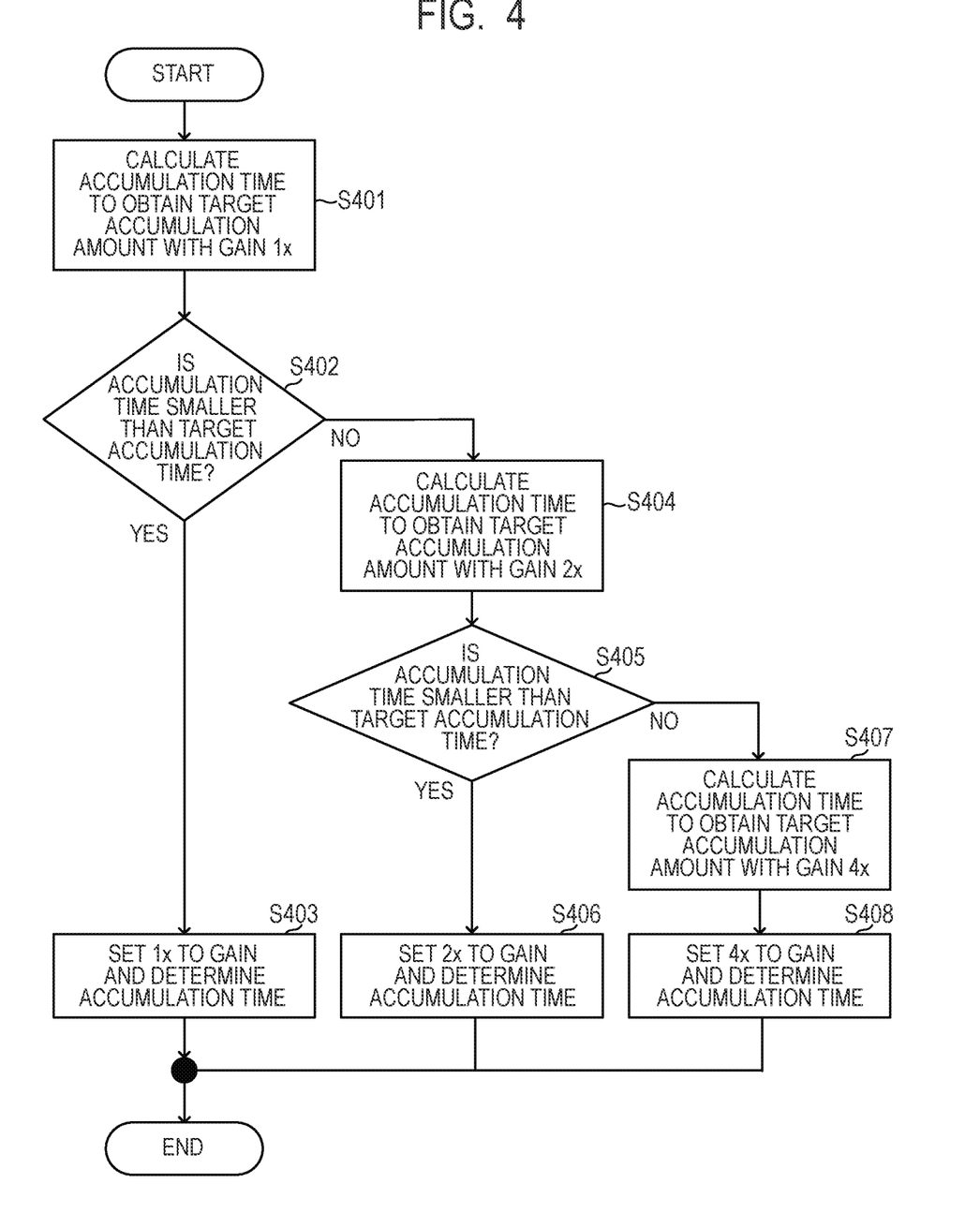
FIG. 4 is a flowchart of a process of calculating an accumulation time.

FIG. 4 is a flowchart of the process of setting the gain and the accumulation time in step S207.

In step S401, the accumulation time for obtaining the target accumulation amount calculated in step S206 with the gain 1× is calculated, and the process proceeds to step S402. As a method of calculating the accumulation time, the accumulation time is proportionally calculated from the previous gain and accumulation time, the subject brightness obtained in step S203, and the target accumulation amount obtained in step S206. For example, when the previous gain is 2×, the accumulation time is 1 ms, the subject brightness is 100, and the target brightness is 200, the accumulation time for obtaining the target brightness (200) at the gain 1× is, 1 ms (previous accumulation time)×2 (gain ratio)×2 (brightness ratio)=4 ms.

In step S402, it is checked whether or not the accumulation time calculated in step S401 is equal to or less than the target accumulation time obtained in step S205. If the accumulation time is equal to or less than the target accumulation time, the process proceeds to step S403, and if the accumulation time exceeds the target accumulation time, the process proceeds to step S404.

In Step S403, the gain is set to 1× and the accumulation time is set to the accumulation time calculated in step S401, and the process is terminated.

In step S404, an accumulation time for obtaining the target accumulation amount calculated in step S206 with the gain 2× is calculated, and the process proceeds to step S405. Since the method of calculating the accumulation time is the same as that in step S401, the description thereof will be omitted.

In step S405, it is checked whether or not the accumulation time calculated in step S404 is equal to or less than the target accumulation time obtained in step S205. When the accumulation time is equal to or less than the target accumulation time, the process proceeds to step S406, and when the accumulation time exceeds the target accumulation time, the process proceeds to step S407.

In step S406, the gain is set to 2×, the accumulation time is set to the accumulation time calculated in step S404, and the process is terminated.

In step S407, the accumulation time for obtaining the target accumulation amount calculated in step S206 with the gain 4× is calculated, and the process proceeds to step S408. Since the method of calculating the accumulation time is the same as that in step S401, the description thereof will be omitted.

In step S408, the gain is set to 4×, and the accumulation time is set to the accumulation time calculated in Step S407, and the process is terminated. When the subject brightness is too low, the accumulation time may become too long. Therefore, when the accumulation time calculated here is equal to or greater than a predetermined value, processing for limiting the accumulation time to be within the predetermined value may be added.

That is, the phase difference sensor controller 109 sets the minimum gain that can make the accumulation time for obtaining the target accumulation amount equal to or shorter than the target accumulation time. However, when the accumulation time for obtaining the target accumulation amount cannot be made equal to or shorter than the target accumulation time, the gain is set to a settable maximum gain. In this way, by setting the minimum gain necessary to obtain the target accumulation amount under a condition of the target accumulation time or less, it is possible to perform focus detection while maintaining detection accuracy in the target accumulation time or less.

Figure 5:
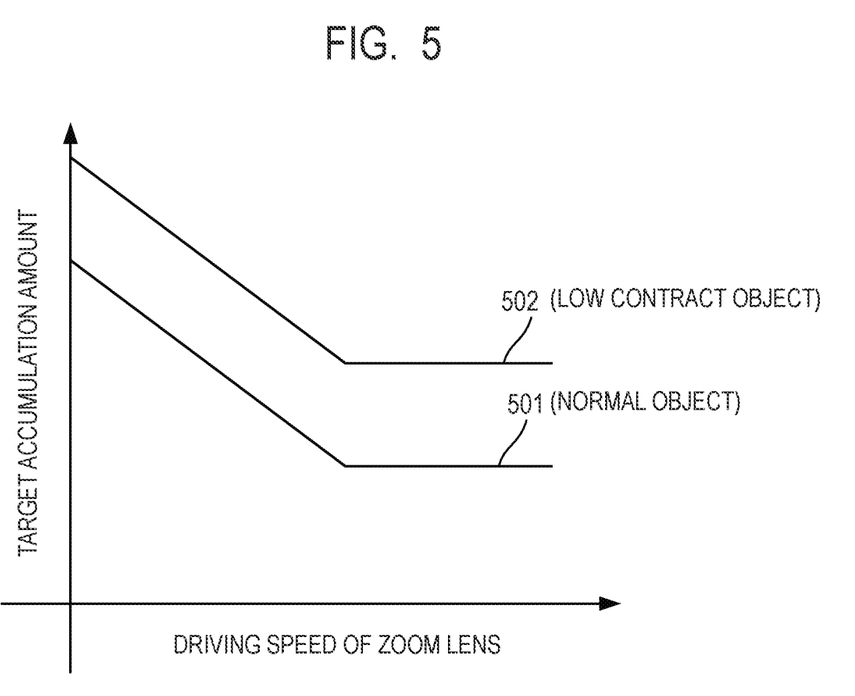
FIG. 5 is a graph showing a relationship between a driving speed of a zoom lens unit and a target accumulation amount.

FIG. 5 is a graph showing the relationship between the driving speed of the zoom lens unit 103 and the target accumulation amount.

As shown in FIG. 5, in this embodiment, the target accumulation amount is configured to decrease as the driving speed of the zoom lens unit 103 increases. When the zoom lens unit 103 is driven, the light beam incident on the focus detector 108 changes, and the focus detection position (the position of the image in the sensor) changes. Since the amount of change depends on the driving speed of the zoom lens unit 103, it is desirable to shorten the focus detection period as the driving speed increases. However, if the accumulation amount becomes less than a predetermined value, deterioration of the accuracy in the focus detection becomes significant, and therefore, it is desirable to limit the target accumulation amount so as not to become less than the predetermined value. In this example, a case in which the target accumulation amount is changed linearly with respect to the driving speed of the zoom lens unit 103 has been described, but a configuration in which the target accumulation amount is changed non-linearly, may be adopted.

Lines 501, 502 in the graph indicate a case where it is determined in step S304 in FIG. 3 that the object contrast value is equal to or greater than the predetermined value (normal object) and a case where it is determined that the object contrast value is less than the predetermined value (low-contrast object). In this example, a case in which a predetermined value is constantly added to the target accumulation amount for the low-contrast subject with respect to the target accumulation amount for the normal subject has been described, but the addition amount may be changed in accordance with the driving speed of the zoom lens unit 103.

As described above, in this embodiment, by making the target accumulation amount variable according to the driving speed of the zoom lens unit 103, control is carried out so as to obtain an output in a state in which the accumulation amount is large when the zooming speed is low, and control is carried out so as to shorten the focus detection period when the zooming speed is high. A case where control is carried out so as to obtain an output in a state in which the accumulation amount is large, is advantageous in a case where a change in the focus detection position is small. On the other hand, a case where the focus detection period is controlled to be short, is advantageous in a case where the focus detection position changes frequently. During zooming, since the focus detection position is likely to change in proportion to the speed of zooming, the above-described control provides an effect of reducing a delay in focus adjustment.

Also, by making the target accumulation amount variable instead of limiting the accumulation time, it is possible to maintain a constant focus detection accuracy when the subject brightness is low.

In the present embodiment, an example in which the target accumulation amount is changed in accordance with the driving speed of the zoom lens unit 103 has been described. However, the target accumulation amount may be changed in accordance with the driving speed of the focus lens unit 102.

An autofocus apparatus according to the disclosure includes the detection unit configured to photoelectrically convert at least a part of a light beam for photography, the controller configured to control driving of the detection unit, and the defocus amount obtaining unit configured to obtain the defocus amount based on an output of the detection unit. The controller controls the accumulation time of the detection unit based on a temporal change (temporal change rate) of a state quantity based on at least one of the output of the detection unit and the driving state of the optical member.

Embodiment 2

A second embodiment will be described below with reference to FIGS. 6 and 7. In this embodiment, components common to those in the first embodiment are denoted by the same reference numerals as those in the first embodiment.

Figure 6:
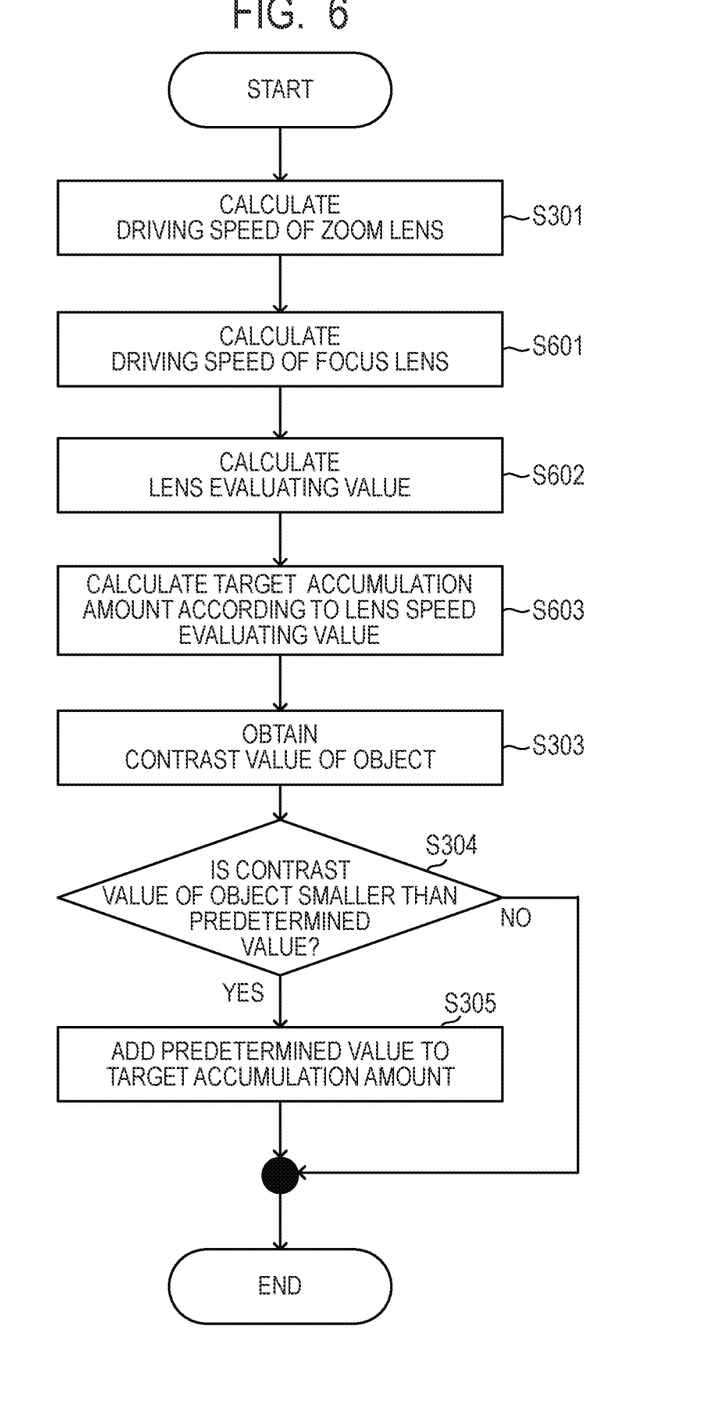
FIG. 6 is a flowchart of a process of calculating the target accumulation amount in second embodiment.

FIG. 6 is a flowchart of a process for calculating the target accumulation amount in the second embodiment. Since step S301 is the same as FIG. 3 of the first embodiment, the description thereof will be omitted.

In step S601, the driving speed of the focus lens unit 102 is calculated from the position information of the focus lens unit 102 detected by the lens position detector 112, and the process proceeds to step S602.

In step S602, a lens speed evaluation value is calculated from the zoom lens driving speed and the focus lens driving speed calculated in steps S301 and S601, and the process proceeds to step S603. The lens speed evaluation value may be, for example, a faster one of the zoom lens driving speed and the focus lens driving speed, or may be the sum of both. Alternatively, the above-described calculation may be performed by multiplying each of the zoom lens driving speed and the focus lens driving speed by a predetermined coefficient.

In step S603, a target accumulation amount is calculated in accordance with the lens speed evaluation value calculated in step S602, and the process proceeds to step S303. The relationship between the lens speed evaluation value and the target accumulation amount will be described with reference to the graph of FIG. 7 (described later).

Since steps S303 to S305 are the same as those in FIG. 3 in the first embodiment, description thereof will be omitted.

Figure 7:
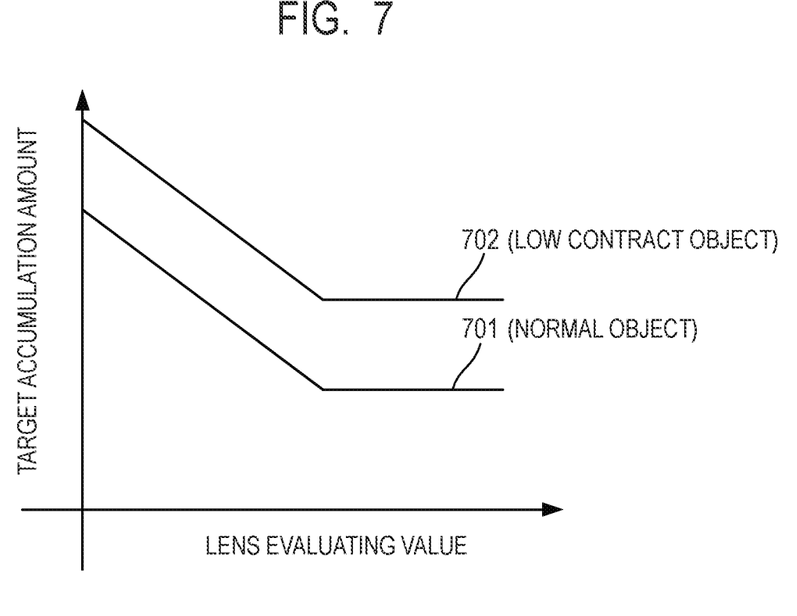
FIG. 7 is a graph showing a relationship between a lens speed evaluation value and the target accumulation amount in the second embodiment.

FIG. 7 is a graph showing the relationship between the lens speed evaluation value and the target accumulation amount in the second embodiment.

As shown in FIG. 7, in this embodiment, it is configured such that the higher the lens speed evaluation value is, the smaller the target accumulation amount is. When the zoom lens unit 103 and the focus lens unit 102 are driven, the light beam incident on the focus detector 108 changes, and the focus detection position changes. Since amounts of the changes depend on the driving speeds of the zoom lens unit 103 and the focus lens unit 102, it is desirable to shorten the focus detection period as the driving speeds are faster. In the second embodiment, the lens speed evaluation value is calculated in consideration of the degree of influence of each of the zoom lens unit 103 and the focus lens unit 102 on the focus detection position, and the target accumulation amount is made variable.

Since other configurations are the same as those in FIG. 5 of the first embodiment, description thereof will be omitted.

As described above, in this embodiment, the lens speed evaluation value is calculated in accordance with the driving speeds of the zoom lens unit and the focus lens unit, and the target accumulation amount is controlled. Thus, since the accumulation amount and the control period are changed in consideration of the influence on the focus detection position by the operation of each of the plurality of optical members, the delay of the focus adjustment can be reduced.

Embodiment 3

A third embodiment will be described below with reference to FIGS. 8 to 10. In this embodiment, components common to those in the first embodiment are denoted by the same reference numerals as those in the first embodiment.

In the first and second embodiments, the driving condition of the phase difference sensor is determined based on the driving speed of the lens. However, in the present embodiment, an example in which the driving condition of the phase difference sensor is determined based on the sensitivity of the lens will be described.

Figure 8:
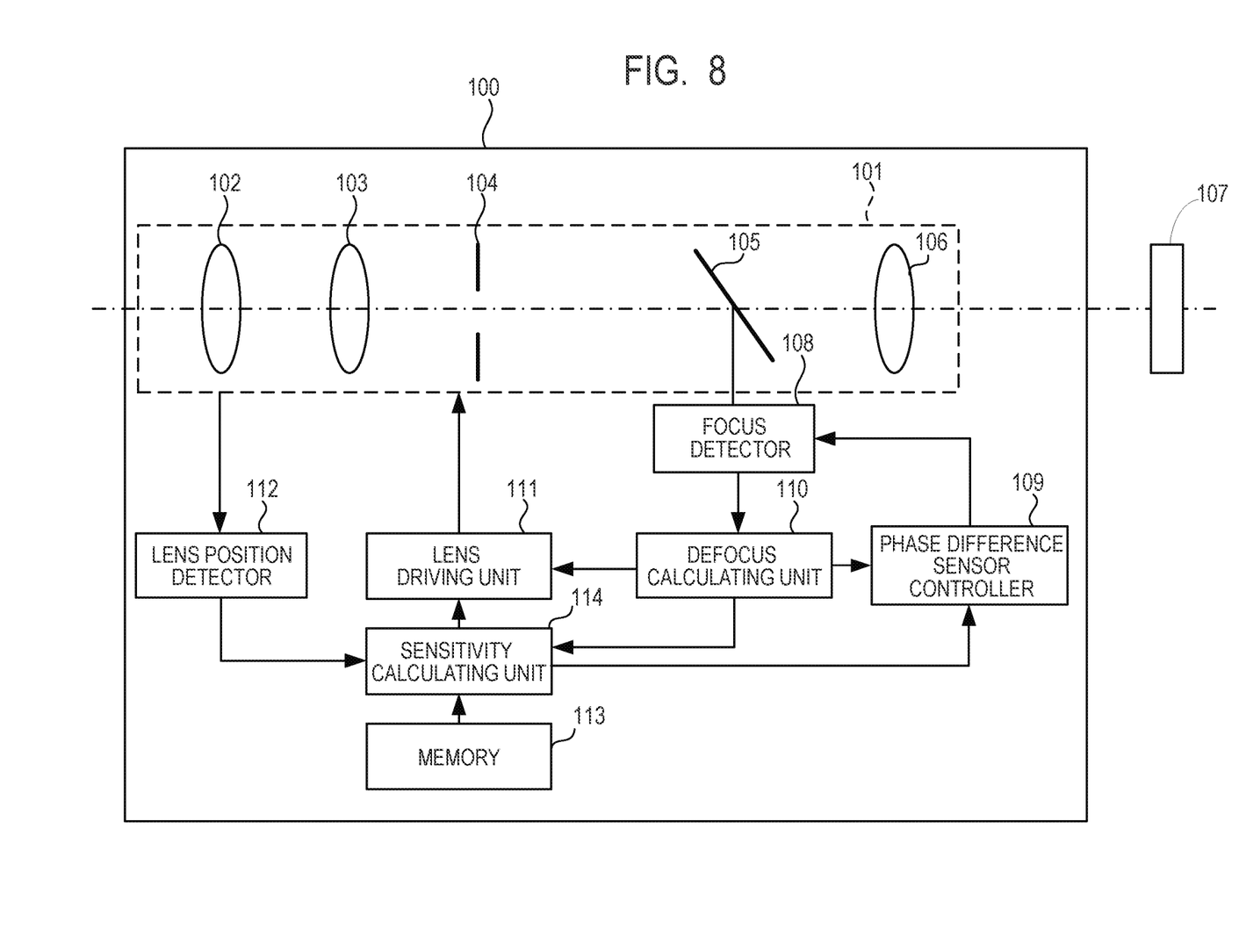
FIG. 8 is a block diagram showing a configuration of an autofocus apparatus according to third embodiment.

FIG. 8 shows a configuration of a lens apparatus 100 according to the third embodiment of the autofocus apparatus. The same components as those of the first embodiment shown in FIG. 1 will not be described.

A memory 113 is a nonvolatile memory such as a ROM, and holds sensitivity information which is an image plane change amount (focus sensitivity, image plane change coefficient) per unit movement amount of the focus lens unit 102.

The sensitivity calculating unit 114 calculates the current sensitivity from the sensitivity information stored in the memory (storage) 113, the position information of the focus lens unit 102 and the zoom lens unit 103, and the defocus amount calculated by the defocus calculating unit 110. The lens driving unit 111 determines a driving amount of the focus lens unit 102 from the defocus amount calculated by the defocus calculating unit 110 and the sensitivity calculated by the sensitivity calculating unit 114. In addition, the phase difference sensor controller 109 determines the next phase difference sensor driving condition from the previous driving condition of the phase difference sensor, the object brightness value and the contrast value input from the defocus calculating unit 110, and the sensitivity calculated by the sensitivity calculating unit 114.

Figure 9:
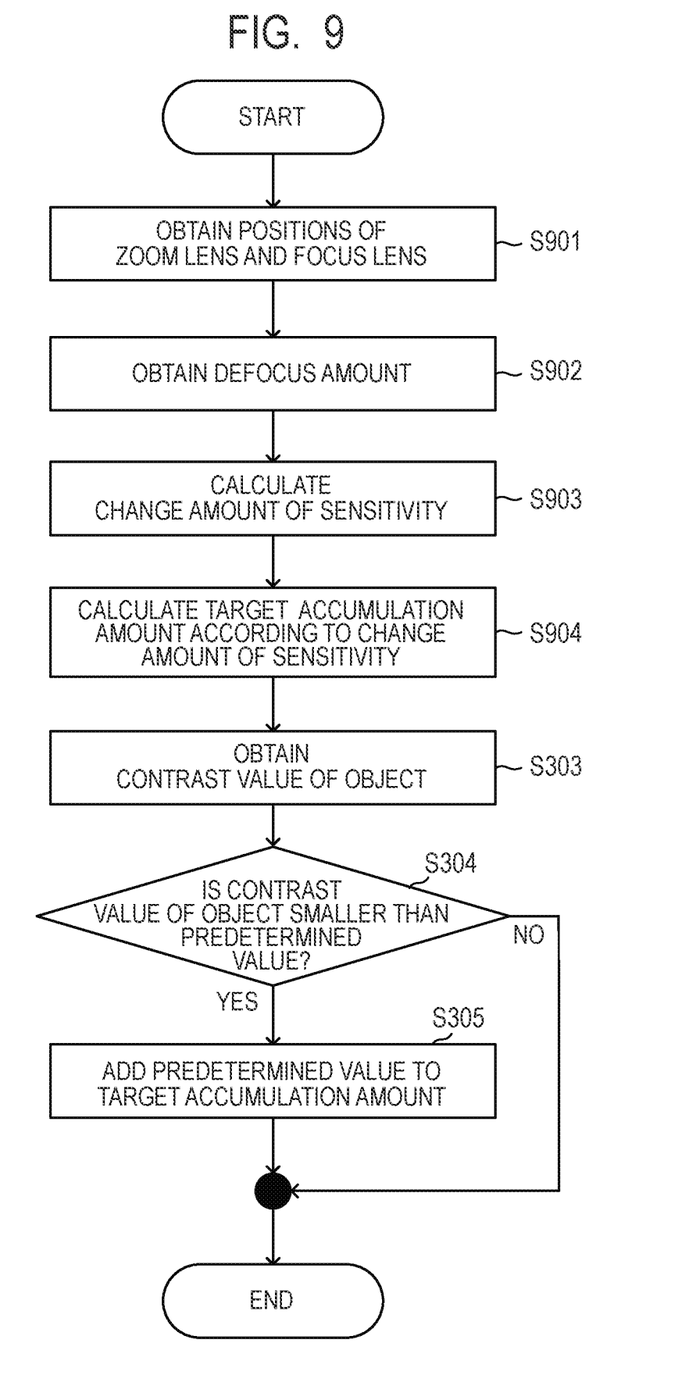
FIG. 9 is a flowchart of a process of calculating the target accumulation amount in the third embodiment.

FIG. 9 is a flowchart of processing for calculating the target accumulation amount in the third embodiment.

In step S901, the position information on the focus lens unit 102 and the zoom lens unit 103 detected by the lens position detector 112 is obtained, and the process proceeds to step S902.

In step S902, the defocus amount calculated by the defocus calculating unit 110 is obtained, and the process proceeds to step S903.

In step S903, a sensitivity is calculated from the position information on the focus lens unit 102, the position information on the zoom lens unit 103 obtained in step S901, and the defocus amount obtained in step S902. Further, a change amount of sensitivity is calculated from the change amount from the previously calculated sensitivity and the elapsed time, and the process proceeds to step S904.

In step S904, the target accumulation amount is calculated from the change amount of sensitivity calculated in step S903, and the process proceeds to step S303. The relationship between the change amount of sensitivity and the target accumulation amount will be described with reference to the graph of FIG. 10 (to be described later).

Since steps S303 to S305 are the same as those in FIG. 3 in the first embodiment, description thereof will be omitted.

Figure 10:
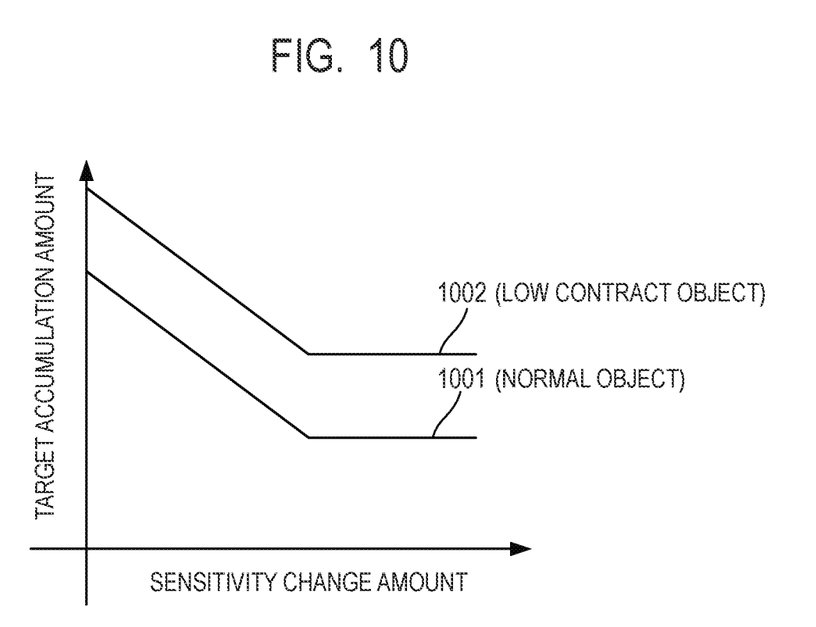
FIG. 10 is a graph showing a relationship between the sensitivity change amount and the target accumulation amount in the third embodiment.

FIG. 10 is a graph showing the relationship between the change amount of sensitivity and the target accumulation amount in the third embodiment.

As shown in FIG. 10, in this embodiment, the target accumulation amount is decreased as the change amount of sensitivity is increased. When the zoom lens unit 103 and the focus lens unit 102 are driven, the light beam incident on the focus detector 108 changes, and the focus detection position changes. When the object moves, the focus detection position also changes. In the third embodiment, the change amount of sensitivity is calculated from the zoom lens unit 103, the focus lens unit 102, and the defocus amount, and the target accumulation amount is made variable.

Since other configurations are the same as those in FIG. 5 of the first embodiment, description thereof will be omitted.

As described above, in this embodiment, the change amount of sensitivity is calculated according to the zoom lens unit 103, the focus lens unit 102, and the defocus amount, and the target accumulation amount is controlled. When the sensitivity changes, the depth of field changes, and thus the focus detection accuracy changes. As a result, even if the distance between the object and the lens does not change, the focus detection position may change. In the present embodiment, since the accumulation amount is controlled in accordance with the change in sensitivity, a focus adjustment control is performed at a high frequency under a condition in which a change in focus detection position is likely to occur, and a delay in focus adjustment can be reduced.

Embodiment 4

A fourth embodiment will be described below with reference to FIGS. 11 and 12. In this embodiment, components common to those in the first embodiment are denoted by the same reference numerals as those in the first embodiment.

In the first to third embodiments, the driving condition of the phase difference sensor is determined based on the driving state of the lens. However, in the present embodiment, an example in which the driving condition of the phase difference sensor is determined based on the object moving speed will be described.

Figure 11:
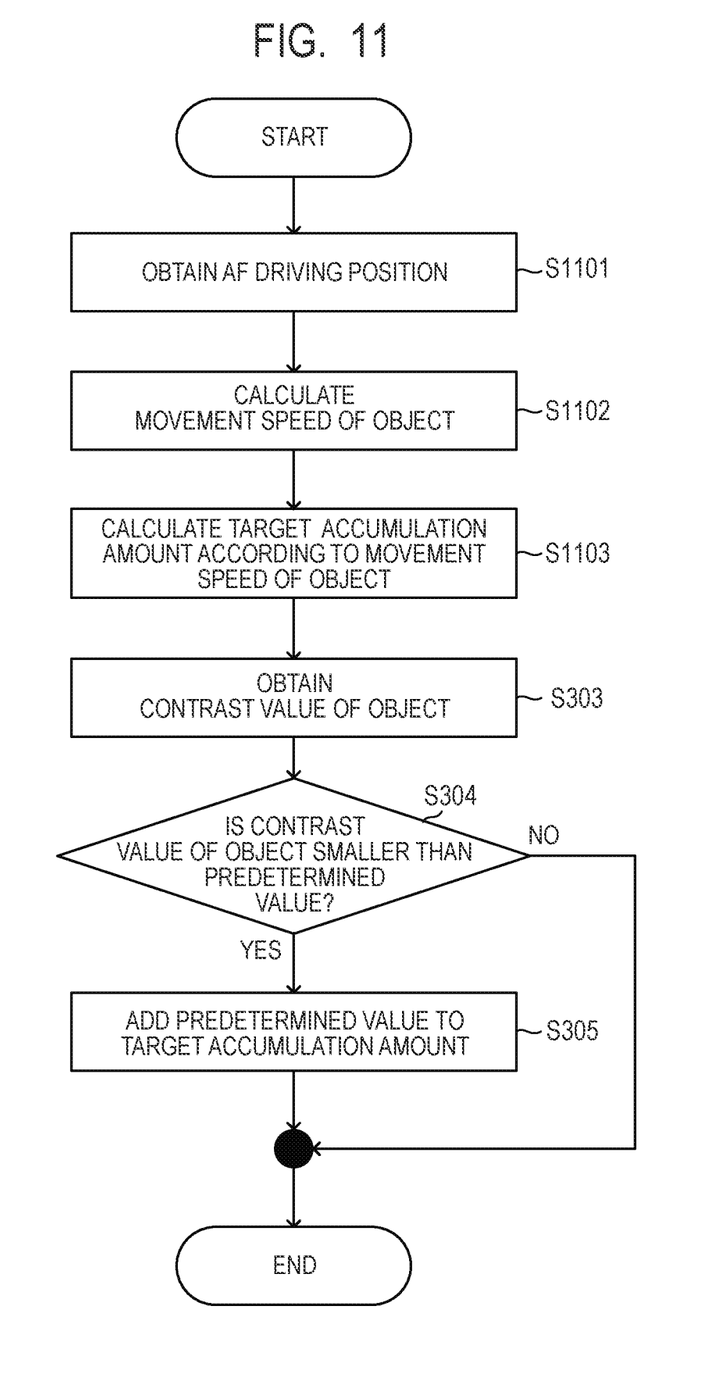
FIG. 11 is a flowchart of a process of calculating the target accumulation amount in fourth embodiment.

FIG. 11 is a flowchart of a process of calculating the target accumulation amount in the fourth embodiment.

In step S1101, the target position (AF drive position) of the focus lens unit 102 driven by the lens driving unit 111 is obtained, and the process proceeds to step S1102.

In step S1102, the object moving speed is calculated from the AF driving position obtained in step S1101 and the elapsed time from the previous AF driving, and the process proceeds to step S1103.

In step S1103, a target accumulation amount is calculated in accordance with the object moving speed calculated in step S1102, and the process proceeds to step S303. A relationship between the object moving speed and the target accumulation amount will be described with reference to a graph of FIG. 12 (to be described later).

Since steps S303 to S305 are the same as those in FIG. 3 in the first embodiment, description thereof will be omitted.

Figure 12:
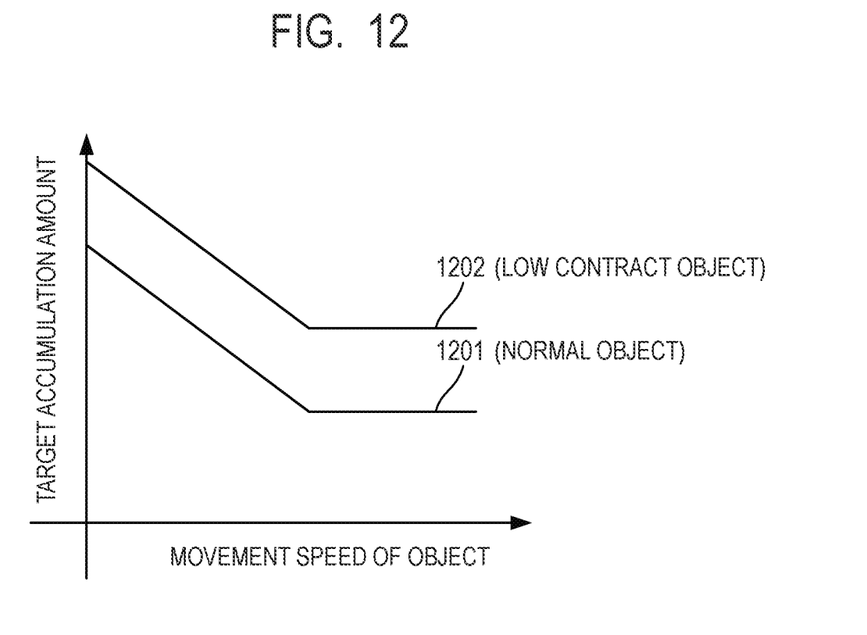
FIG. 12 is a graph showing a relationship between an object moving speed and the target accumulation amount in the fourth embodiment.

FIG. 12 is a graph showing the relationship between the object moving speed and the target accumulation amount in the fourth embodiment.

As shown in FIG. 12, in the present embodiment, the target accumulation amount is reduced as the object moving speed increases. When the object moving speed is high, a delay is likely to occur in the focus adjustment operation by the focus lens unit 102, and thus it is desirable to shorten the focus detection period. In the fourth embodiment, the target accumulation amount is variable in accordance with the detection result of the focus detector 108.

Since other configurations are the same as those in FIG. 5 of the first embodiment, description thereof will be omitted.

As described above, in the present embodiment, the object movement speed (change speed of the object distance) is calculated from the focus detection position and the target accumulation amount is controlled, so that a delay is less likely to occur in driving of the focus lens unit for focus adjustment. When the object moving speed is high, the change in the focus detection position becomes large even if the lens driving state does not change. In the present embodiment, since the accumulation amount is controlled in accordance with the object moving speed, focus adjustment control is performed at a high frequency for a moving object, so that a delay in focus adjustment can be reduced.

By configuring a lens apparatus having the automatic focus adjustment device of the disclosure, it is possible to realize a lens apparatus that can obtain the effects of the disclosure.

Further, by constituting an image pickup apparatus having a lens apparatus having the autofocus apparatus (focus information obtaining apparatus) of the disclosure and an image pickup element configured to pick up an image formed by the lens apparatus, it is possible to realize an image pickup apparatus capable of attaining the effects of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-002113, filed Jan. 11, 2022, which is hereby incorporated by reference herein in its entirety.

What is claimed is:

1. A focus information obtaining apparatus comprising:
at least one processor;
a memory coupled to the at least one processor storing instructions
that, when executed by the at least one processor, cause the at least one processor to function as:
a detector configured to detect at least a part of a light beam from an object via an optical member including a lens unit;
a controller configured to determine a charge accumulation time of the detector; and
an obtaining unit configured to obtain information on a focus state based on an output of the detector,
wherein the controller is configured to control the detector based on an output of the detector and a driving speed of the lens unit, and
wherein the charge accumulation time of the detector is set to be long when the driving speed of the lens unit is low, and the charge accumulation time of the detector is set to be short when the driving speed of the lens unit is high.

2. The focus information obtaining apparatus according to claim 1, wherein the controller is configured to control the charge accumulation time of the detector based on the driving speed of the lens unit.

3. The focus information obtaining apparatus according to claim 1, wherein the lens unit is at least one of a focus lens unit and a zoom lens unit.

4. The focus information obtaining apparatus according to claim 1, wherein the controller is configured to control the detector based on a moving speed of an object image.

5. The focus information obtaining apparatus according to claim 4, further comprising a storage configured to store a change amount of a position of the object image for a change amount of a position of the lens unit.

6. The focus information obtaining apparatus according to claim 1, wherein the controller is configured to control the detector based on a temporal change rate of a defocus amount.

7. The focus information obtaining apparatus according to claim 1, wherein the controller is configured to control the detector based on a temporal change rate of a contrast of an object image.

8. The focus information obtaining apparatus according to claim 1, wherein the controller is configured to control the detector so that a charge accumulation amount in the detector is not less than a threshold.

9. The focus information obtaining apparatus according to claim 8, wherein the controller is configured to control the detector based on the threshold and a brightness of the object.

10. The focus information obtaining apparatus according to claim 1, wherein the controller is configured to control a charge accumulation time and a gain of the detector.

11. The focus information obtaining apparatus according to claim 10, wherein a range of the gain controlled by the controller is limited.

12. A lens apparatus comprising:
   an optical member; and
   a focus information obtaining apparatus,
   wherein the focus information obtaining apparatus comprises:
      at least one processor;
      a memory coupled to the at least one processor storing instructions that, when executed by the at least one processor, cause the at least one processor to function as:
      a detector configured to detect at least a part of a light beam from an object via the optical member including a lens unit;
      a controller configured to determine a charge accumulation time of the detector; and
      an obtaining unit configured to obtain information on a focus state based on an output of the detector,
   wherein the controller is configured to control the detector based on an output of the detector and a driving speed of the lens unit, and
   wherein the charge accumulation time of the detector is set to be long when the driving speed of the lens unit is low, and the charge accumulation time of the detector is set to be short when the driving speed of the lens unit is high.

13. An image pickup apparatus comprising:
   the lens apparatus according to claim 12; and
   an image pickup element configured to pick up an image formed by the lens apparatus.

14. A focus information obtaining method comprising:
   detecting at least a part of a light beam from an object via an optical member including a lens unit by a detector;
   determining a charge accumulation time of the detector;
   obtaining information on a focus state based on an output of the detector; and:
   controlling the detector based on an output of the detector and a driving speed of the lens unit,
   wherein the charge accumulation time of the detector is set to be long when the driving speed of the lens unit is low, and the charge accumulation time of the detector is set to be short when the driving speed of the lens unit is high.

15. A non-transitory computer-readable storage medium storing a program for causing a computer to execute the focus information obtaining method according to claim 14.

* * * * *